Patented Mar. 31, 1953

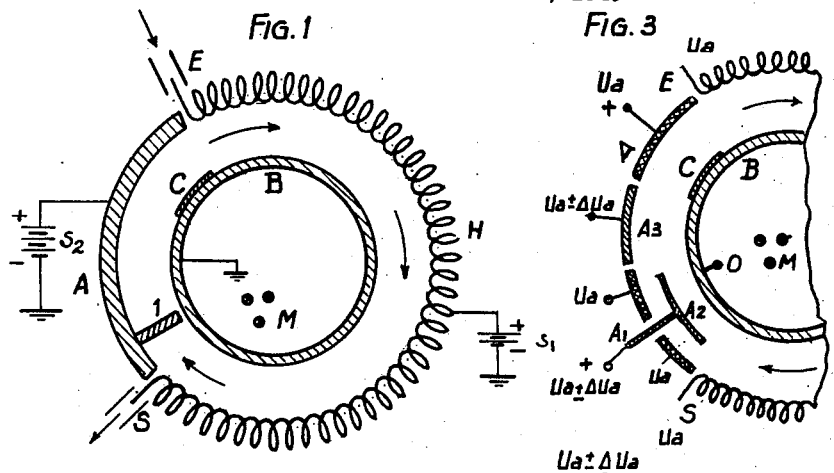

2,633,505

UNITED STATES PATENT OFFICE 2,633,505

ULTRA-SHORT WAVE TRANSMITTING AND AMPLIFYING TUBE

Alfred Lerbs, Paris, France, assignor to Compagnie Generale de Telegraphie Sans Fil, a corporation of France Application February 12, 1949, Serial No. 76,096

7 Claims. (Cl. 179—171)

In co-pending application, Serial No. 794,164, filed on December 27, 1947, now Patent 2,511,407, issued June 13, 1950, a tube is described wherein use was made of an electromagnetic wave propagated at a certain speed in a circular guide, and wherein the use of a radial electric field and of a transverse magnetic field has the effect of imparting to the electrons of a beam a circular movement parallel to said guide, during which movement they are in a state of interaction with said electromagnetic wave. This tube was constructed in such a manner that said electromagnetic wave had the same speed as the electrons, so as to increase its efficiency and its power. The guide through which said wave is adapted to pass could be constructed in any form that would produce and determine the progression of said wave, in particular in the form of an artificial line that can be obtained either by suitably dimensioning the resonant cavities of a split anode, or by using a solenoid of circular shape, or in any other suitable manner. Means have been provided in the aforesaid patent application, for enabling said tube to be used as a power amplifier, said means being in particular intended to prevent the production of oscillations, and to prevent all the electrons, after they have passed through the state of interaction, during a cycle of rotation, with the field of the electromagnetic wave, from returning to said field. For this purpose, in particular, they were collected by means of an additional electrode located between the output and input circuits of the tube.

I have discovered that a fraction of the electrons thus collected had not been in a state of complete interaction with the wave and that it was advantageous, in order to obtain maximum power from the tube and make it operate at high efficiency while retaining its stability of operation, to make said fraction of electrons repeat the interaction cycle. I also discovered that the electrons which have completely interacted, when travelling through a space bounded by a pair of electrodes across which a potential difference has been applied, travelled through a zone near the electrode which was raised to a higher potential, whereas the other electrons, which have not completely interacted, remained closer to the electrode which was raised to a lower potential.

The present invention has for its object a novel manner of constructing tubes of this type, which is characterised in that the electrons which have completely interacted with the electromagnetic wave are prevented from repeating the interaction cycle, and on the other hand the other electrons, which have incompletely interacted, are again directed into this electromagnetic field.

According to the invention, the space between the electrodes that bound the circulation space for the beam is divided into two channels, one being terminated by the means for stopping the electrons of the first category, the other allowing the electrons of the second category to pass and directing them towards the field of the travelling wave so that they can repeat the interaction cycle.

This latter channel is obtained, in particular, by dividing the electrodes into fractions, or by inserting additional electrodes and giving them suitable voltages so that when said second category of electrons enter again into the electromagnetic field, they acquire the most favorable phase for their interaction. Said phase must on the other hand be so adjusted that the risk of producing oscillation is reduced to a minimum.

According to a modfication of the invention, the phase of said electrons is also adjusted by acting on the magnetic field of the tube.

The invention will be more clearly understood by means of the accompanying figures which show, by way of non-limitative examples, several embodiments thereof.

Fig. 1 shows diagrammatically a tube constructed according to the aforesaid patent application.

Fig. 2 shows an embodiment of the invention, which comprises means for collecting the electrons that have completely interacted, while the other electrons continue on their course around the circular path.

Fig. 3 shows the location of the device of Fig. 2, in a complete tube, only half of which is shown, and which comprises between S and E an "inoperative portion" of the tube. By "inoperative portion" is to be understood the portion wherein the electrons continue on their course but wherein, since there is no field, there is no interaction.

Figs. 4 to 7 show several embodiments of the invention, which enable the phase adjustment of the electrons which are intended to be returned to the electromagnetic field, these devices always being located in the inoperative portion.

Figs. 8 to 11 show a particular embodiment of the tube that enables a differential acceleration to be imparted to the electrons in the inoperative portion of the tube.

In Fig. 1, a tube according to the aforesaid patent application is shown diagrammatically. A beam emitted by a cathode C flows through the interaction space bounded on the inside by a circular electrode B. In order to give a definite idea, the emitting strip C has been directly arranged on B, and the whole electrode is connected to the negative pole of the source S1 of the radial electric field, so that hereinafter B will indiscriminately be designated as the cathode. The outer electrode, which is connected to the positive pole of the source S1 of the field and is consequently called the anode, is divided into two circular portions H and A, each of which occupies an arc of less than 360° and which are complementary to one another to form a complete circle. H denotes the portion of the anode formed by a spirally wound wire and is of circular shape. E represents the input circuit to which is fed the ultra-short-wave to be amplified and S represents the output circuit from which the amplified power is obtained. The parameters of the tube are so chosen that said wave sets up, in the space between the anode and the cathode B, an electromagnetic field which gradually moves forwards at the same speed as the electrons emitted by the strip C located near the input circuit. The cathode B need not be completely covered with an emitting substance provided that the strip C is preferably located near the input circuit E. A denotes the fraction of the anode that does not participate in the propagation of the electromagnetic wave and I denotes the electrode which is connected to the positive terminal of a source of potential S2 electrons after they have effected a complete cycle of rotation shown by the arrows between the circuits E and S. The magnetic excitation field of the tube is represented by the cross M and is at right angles to the plane of the drawing. The electric field is radial and is directed from the cathode towards the anode which is given a positive potential relatively to the cathode.

I have discovered that such a tube, although not having the drawback of producing oscillations, and having the advantage of stable operation, is of very low efficiency since all the electrons are indiscriminately collected by said electrode I and consequently produce high power losses.

In order to increase the efficiency, according to the invention, only those electrons which have completely interacted are stopped, and the other electrons are allowed to effect a fresh interaction cycle.

An embodiment of the tube that enables this result to be obtained is shown in Fig. 2 wherein the same reference symbols denote the same members as in Fig. 1. This figure only shows a fraction of Fig. 1, taken in the anode space A between the input and output circuits, wherein of course the electrode I has been eliminated. Between the anode A and the cathode B are arranged two electrodes A1 and A2 which are connected to a positive potential relatively to the cathode (which, in the present example, is at zero potential), said potential being adjustable with respect to the potential of the anode A, this having been denoted by the symbol Ua ± Ua. By adjusting this potential, it is possible to vary the speed of the electrons and thereby adjust the number of electrons collected. The electrons which have interacted with the wave and which, in general, are located in regions near the anode, are collected by this additional electrode A1, whereas the electrode A2, which is located along an equipotential line, thereby not altering the distribution of the field and not disturbing the flow of the electrons, forms, with the cathode B, a duct through which the electrons which have not participated at all in the interaction or which have only incompletely participated therein, are again directed towards the electromagnetic field. The distances between said electrode A2 and the anode depend on the parameters of the tube, the anode voltage and the magnetic field.

In Fig. 3, wherein the same members are denoted by the same reference symbols as in Fig. 1, the location of said additional electrodes A1 and A2 has been shown relatively to the anode portion E—S through which the electromagnetic wave passes.

The electrons which have not been collected penetrate again into the input circuit and repeat their interaction with the electromagnetic wave. In order to increase the efficiency of the tube and at the same time prevent any self-oscillation, it is important to give said electrons, at the instant when they reach the terminal E, a suitable phase with respect to the phase of the electromagnetic wave. Such phase depends on the transit time of the electrons between the terminals S and E (see Fig. 3). Said time is defined by the speed of the electrons and the length of the path S—E. For a given length, the phase may be adjusted by acting on the speed. This can be effected in particular by changing the intensity of the electric field over this electron path or over a part of said path, or the intensity of the magnetic field; the speed of the electrons being given by the equation $$V = \frac{E}{B}C$$

in which C is a constant and E and B the intensities of the electric and magnetic fields. Several embodiments of this adjustment are described hereinafter.

According to Fig. 4, the anode A is divided into fractions and provision is made therein of a segment A3, the potential of which is adjusted in a suitable manner. In Fig. 3, the position of this device has been shown with respect to the other electrodes of the tube, in particular the collecting electrodes A1, A2.

According to another embodiment shown in Fig. 5, the phase of the electrons is adjusted by providing a gap in the electrode A and placing opposite said gap an additional electrode A4, the potential of which is adjusted in a suitable manner. This embodiment has the advantage of preventing the regulating electrode from collecting, in certain cases, a portion of the electrons.

According to Fig. 6, the same result is obtained by dividing the cathode B into fractions and providing therein a segment B1 of a cylinder, the voltage of which is adjusted so as to effect the desired distribution of the electric field.

According to Fig. 7, which is equivalent to Fig. 5, a segment B2, the potential of which is adjusted, is placed opposite a slit in the cathode surface.

In certain cases, it is advantageous to exert a differential action on the electrons, according to whether they have incompletely participated or have not participated at all in the interaction. These electrons travel, in general, at different speeds and their trajectories are of different diameters. In order to exert such differential action, use may be made of the production of an additional field that has a particular distribution in the anode-cathode space and, in particular, widens towards the cathode. Figs. 8 to 11 show several embodiments of such a field.

According to the embodiment of Fig. 8, a slit is provided in the anode surface and a narrow electrode A₅ is placed therein and produces an additional field of conical shape that opens towards the cathode and enables additional speeds to be imparted to the electrons, said speeds being different according to the radial distance between their trajectory and the cathode.

In Fig. 9, the same result is obtained by introducing an additional electrode B₃ into the cathode slit and adjusting its voltage.

According to Fig. 10, an embodiment has been shown that makes use of the two arrangements of Figs. 8 and 9 simultaneously.

According to Fig. 11, the desired field is formed by a combination of electrodes that corresponds to a duplication of the arrangement of Fig. 10, in order to obtain a more gradual adjustment. In most cases, in order not to complicate the design of the tube, it is preferable to use only a single curved electrode.

By thus returning the unused electrons into a state of interaction with the field, the invention enables the emitting surace of the cathode to be decreased for a tube of a given power.

Instead of acting on the electric field, it is possible to produce all the effects described by deforming the magnetic field, between the input and output terminals of the tube, i. e. in the portion of the tube that does not participate in the energy exchange. According to the above mentioned formula, $$V = \frac{E}{B}C$$

an increase in the magnetic field B changes the speed of the electrons in the same direction as a decrease in the electric field E. This adjustment of the magnetic field applies more particularly to the case in which the diameter of the negative electrode B is large. This may be obtained, either by providing additional coils, or by giving a predetermined shape to the pole pieces. In practice, this method of adjustment involves constructional difficulties and is not desirable. It should only be contemplated in combination with the adjustment of the electric field.

In order to avoid self-oscillation, it is necessary in any case to prevent a portion of the high-frequency energy obtained from the output terminal S from continuing the cycle inside the tube and reaching the input terminal E. This can be obtained by placing and constructing said terminals in such a manner as to avoid any coupling between them, and by giving the anode wall, which is located between these two terminals and which does not conduct heavy currents, a high natural resistance.

What I claim is:

1. In an electron amplifier for electromagnetic waves comprising an emissive cathode, means for establishing a substantially time-constant magnetic field, and electron beam developing means, said beam being located within said field, the lines of force of the field, in a given direction, being substantially parallel to the surface of the said cathode; the combination which comprises two substantially parallel conductors having their surfaces parallel to the lines of force of the magnetic field, the conductors being curved along the arc of a circle concentrically to each other to define an interaction duct, the cathode being located between the two conductors adjacent one of the ends thereof, terminal connections to the conductors and a source of potential connected thereto thereby to produce between said conductors a difference of potential giving rise to a substantially time-constant electrostatic field substantially perpendicular to the said time-constant magnetic field, at least one of the conductors being divided into a first operative portion including elements forming an electrical delay line wherein interaction between said electron beam and said waves occurs and into a second inoperative portion wherein no interaction between said electron beam and said waves occurs, said elements being adapted to produce a radio-frequency field having an electrical component perpendicular both to the electrostatic field and to the magnetic field and being so dimensioned that the phase velocity of the wave along the delay line is less than in space and substantially equal to the velocity of electrons in the duct, said electron velocity being determined by the ratio of the intensities of the electrostatic and magnetic fields, the said delay line having radio frequency input and output extremities separate from each other to enable mutual decoupling thereof and to prevent feedback oscillations, the said extremities being provided with means for coupling to outside circuits for exciting an electromagnetic wave in the radio-frequency input terminal and for collecting amplified energy at the radio-frequency output terminal, the said operative and inoperative portions of the delay line being complementary to each other to form a complete circle, means being provided in said inoperative portion adjacent to the output extremity of the delay line for collecting the electrons having passed through the portion of the duct co-extensive with said operative portion and which are traveling close to the conductor raised to the higher potential, said last named means extending into the region filled by said electron beam and incompletely obstructing the cross-section of said beam.

2. An amplifier in accordance with claim 1 wherein said last named means comprises a conductive member intermediate the two conductors and extending parallel therewith and a baffle extending from said member to the electrode of higher potential, said member dividing the duct into two channels, the channel close to the said electrode of higher potential being transversely closed by the said baffle.

3. An amplifier in accordance with claim 1 including a collecting electrode located between said radio-frequency input and output extremities comprising a metallic screen inserted in the circular duct between said terminals, and a terminal connection for imparting to said electrode a potential different relatively to the cathode from that of the conductor raised to the higher potential.

4. An amplifier in accordance with claim 1 wherein the portion of one of the conductors coextensive with said inoperative portion of said other conductor is divided into at least two segments insulated from each other and from the rest of the conductor, each said segment being supplied with a variable potential.

5. An amplifier in accordance with claim 1 further comprising means for varying the said time-constant electrostatic field in said inoperative portion said means comprising auxiliary electrodes close to said inoperative portion with means for impressing variable potentials thereupon.

6. An amplifier in accordance with claim 5 further comprising means for varying the intensity of the said time-constant magnetic field across said inoperative portion said means consisting of a predetermined form of magnetic field producing means.

7. An amplifier in accordance with claim 1 wherein the inoperative portion of said conductor complementary to said delay line is formed of a material of high resistivity.

ALFRED LERBS.

REFERENCES CITED

The following references are of record in the file of this patent:

UNITED STATES PATENTS

| Number | Name | Date |
| --- | --- | --- |
| 2,289,756 | Clavier et al. | July 14, 1942 |
| 2,300,052 | Lindenblad | Oct. 27, 1942 |
| 2,511,407 | Kleen et al. | June 13, 1950 |
| 2,531,972 | Doehler et al. | Nov. 28, 1950 |